United States Patent [19]

Brewer et al.

[11] Patent Number: 5,560,198
[45] Date of Patent: Oct. 1, 1996

[54] COOLED GAS TURBINE ENGINE AUGMENTOR FINGERSEAL ASSEMBLY

[75] Inventors: Keith S. Brewer, North Palm Beach; Douglas R. Bendix, Jupiter; Ronald T. Clawson, Stuart, all of Fla.

[73] Assignee: United Technologies Corporation, Hartford, Conn.

[21] Appl. No.: 450,073

[22] Filed: May 25, 1995

[51] Int. Cl.$^6$ ................................................. F02K 3/10
[52] U.S. Cl. ........................... 60/261; 60/752; 277/22
[58] Field of Search .................... 60/261, 266, 39.31, 60/39.32, 752, 754, 756, 39.83; 277/22, 236, 215

[56] References Cited

U.S. PATENT DOCUMENTS

| | | | |
|---|---|---|---|
| 2,794,319 | 6/1957 | Stockdale | 60/261 |
| 2,851,854 | 9/1958 | Doll, Jr. | 60/261 |
| 3,121,995 | 2/1964 | Albani | 60/39.32 |
| 3,349,558 | 10/1967 | Smith | 60/754 |
| 4,071,194 | 1/1978 | Eckert et al. | 239/127.3 |
| 4,203,286 | 5/1980 | Warburton | 60/266 |
| 4,422,300 | 12/1983 | Dierberger et al. | 60/757 |
| 4,566,280 | 1/1986 | Burr | 60/757 |
| 4,695,247 | 9/1987 | Enzaki et al. | 431/352 |
| 4,901,522 | 2/1990 | Commaret et al. | 60/752 |
| 5,060,472 | 10/1991 | Schirtzinger | 60/265 |
| 5,083,422 | 1/1992 | Vogt | 60/39.02 |
| 5,197,852 | 3/1993 | Walker et al. | 415/115 |
| 5,209,059 | 5/1993 | Ward | 60/261 |
| 5,307,637 | 5/1994 | Stickles et al. | 60/756 |
| 5,328,331 | 7/1994 | Bunker et al. | 416/96 R |
| 5,333,443 | 8/1994 | Halila | 60/39.31 |
| 5,335,490 | 8/1994 | Johnson et al. | 60/261 |
| 5,363,643 | 11/1994 | Halila | 60/39.31 |
| 5,363,654 | 11/1994 | Lee | 60/752 |

FOREIGN PATENT DOCUMENTS

| | | | |
|---|---|---|---|
| 848829 | 8/1970 | Canada | 277/22 |
| 599840 | 11/1959 | Italy | 60/39.32 |

Primary Examiner—Timothy S. Thorpe
Assistant Examiner—Ted Kim
Attorney, Agent, or Firm—Richard D. Getz

[57] ABSTRACT

An augmentor for a gas turbine engine with a nozzle is provided having an outer casing, a liner, a stiffening ring, a plurality of fingerseals, and apparatus for fastening the stiffening ring and the fingerseals to the liner. The liner includes a plurality of first cooling apertures. The stiffening ring includes a plurality of second cooling apertures. The finger seals are positioned between the liner and the stiffening ring. Each fingerseal includes a plurality of cooling slots having a lengthwise axis. The cooling slots, first apertures, and second apertures are relatively positioned such that cooling air passing through the second cooling holes must thereafter travel within one of the cooling slots in a direction substantially along the lengthwise axis of the slot, before entering the first apertures.

9 Claims, 2 Drawing Sheets

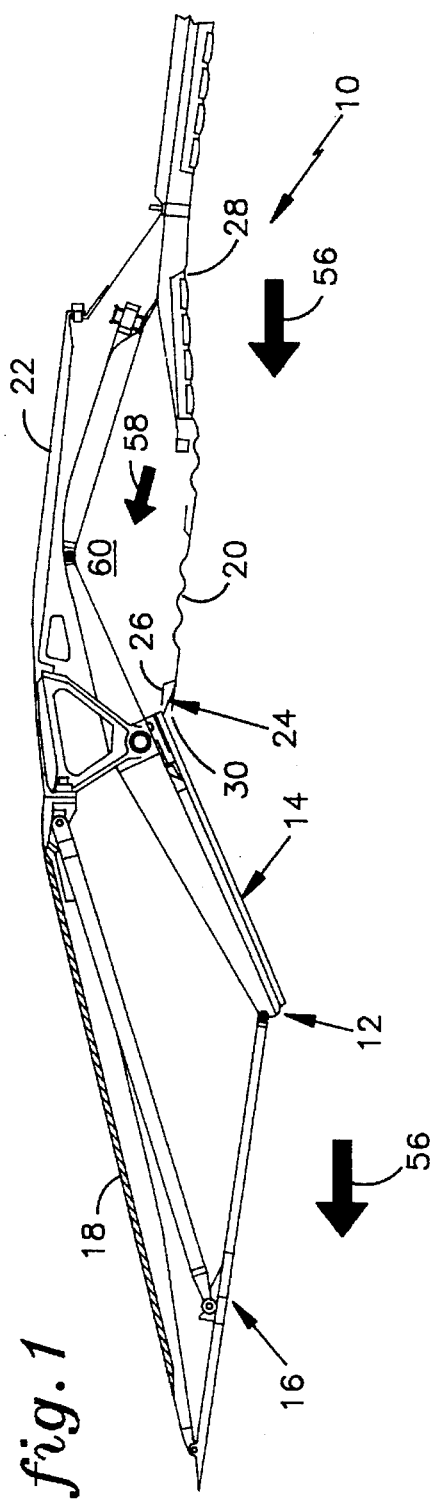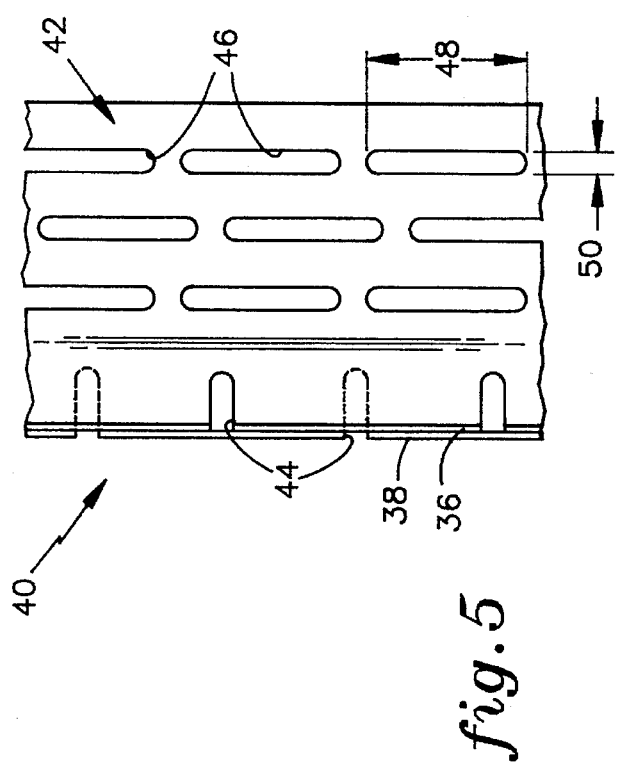

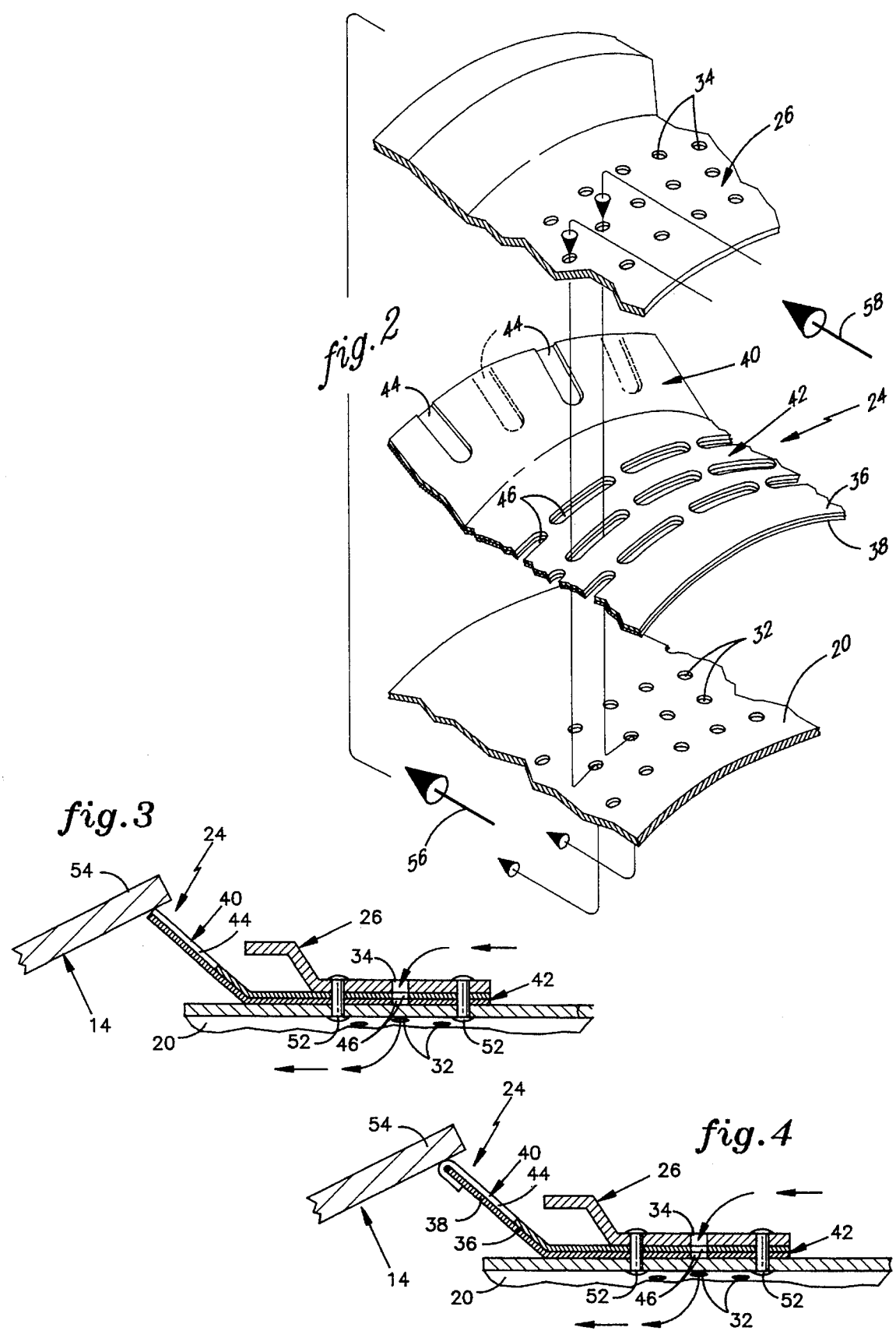

COOLED GAS TURBINE ENGINE AUGMENTOR FINGERSEAL ASSEMBLY

The invention was made under a U.S. Government contract and the Government has rights herein.

BACKGROUND OF THE INVENTION

1. Technical Field

The present invention relates to augmentors for gas turbine engines in general, and to cooled augmentors in particular.

2. Background Information

Augmentors, or "afterburners", are a known means for increasing the thrust of a gas turbine engine. Additional thrust is produced by an augmentor when oxygen contained within the core gas flow of the engine is mixed with fuel and burned. The temperature of the core gas flow within the augmentor requires the inner liner of the augmentor be cooled. Typically, bypass air at a temperature less than that of the core gas flow is used to cool the liner. The bypass air is supplied via an annulus between the liner and outer casing of the augmentor and enters the augmentor through apertures within the liner. Cooling occurs as the air passes through the apertures and subsequently passes along the inner surface, or "hot side", of the liner. Within most of the augmentor, this type of cooling arrangement suffices because of the relatively thin profile of the liner. At the aft end of the augmentor, however, fingerseals and stiffening rings are attached to the inner lining. The cumulative stack of the liner, fingerseals, and stiffening ring minimizes the liner's exposure to cooling air and therefore the associated heat transfer. Consequently, thermal stress and low cycle fatigue are greater in the liner section about the fingerseal area.

What is needed, therefore, is an apparatus for sealing the aft end of the augmentor that avoids the aforementioned stress and fatigue.

DISCLOSURE OF THE INVENTION

It is an object of the present invention, therefore, to provide a cooled augmentor for a gas turbine engine that resists thermal stress and fatigue.

It is another object of the present invention to provide a durable augmentor for a gas turbine engine.

It is still another object of the present invention to provide an aft seal arrangement for an augmentor that is easily manufactured and assembled.

According to the present invention, an augmentor for a gas turbine engine with a nozzle is provided having an outer casing, a liner, a stiffening ring, a plurality of fingerseals, and means for fastening the stiffening ring and the fingerseals to the liner. The liner includes a plurality of first cooling apertures. The stiffening ring includes a plurality of second cooling apertures. The finger seals are positioned between the liner and the stiffening ring. Each fingerseal includes a plurality of cooling slots having a lengthwise axis. The cooling slots, first apertures, and second apertures are relatively positioned such that cooling air passing through the second cooling holes must thereafter travel within cooling slots in a direction substantially along the lengthwise axis of the slot, before entering the first cooling apertures.

An advantage of the present invention is that thermal stress and fatigue are reduced in the aft area of the augmentor. Assembling the stiffening ring, fingerseals, and liner such that the apertures within liner and stiffening ring are offset from one another, forces cooling air passing through apertures in the stiffening ring to travel within the aligned cooling slot a distance before entering apertures within the liner. As a result, the cooling air is exposed to more stiffening ring, fingerseal, and liner surface, thereby enhancing heat transfer with the cooling air.

Another advantage of the present invention is that the durability of the augmentor is increased. Reducing the thermal stress and fatigue within the augmentor helps to increase the usable life of the liner, fingerseals, and stiffening ring. A person of skill in the art will recognize that increasing the life of augmentor parts within a gas turbine engine is a significant advantage.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a diagrammatic partial view of the aft portion of a gas turbine engine.

FIG. 2 is an exploded diagrammatic perspective view of the fingerseal assembly.

FIG. 3 is a diagrammatic side view of a fingerseal assembly embodiment.

FIG. 4 is a diagrammatic side view of another fingerseal assembly embodiment.

FIG. 5 is a top view of a fingerseal.

BEST MODE FOR CARRYING OUT THE INVENTION

Referring to FIG. 1, an augmentor 10 for a gas turbine engine is provided forward of a variable orifice nozzle 12. The nozzle 12 includes a convergent section 14, a divergent section 16, and a shell 18. The augmentor 10 includes a liner 20, an outer casing 22, a plurality of finger seals 24, and a stiffening ring 26. The liner 20 is an annular member disposed about the centerline of the engine and received within the outer casing 22. The liner 20 includes a forward end 28 and an aft end 30.

Referring to FIG. 2, the liner 20 further includes a plurality of first cooling apertures 32 disposed in a particular geometric arrangement. The stiffening ring 26 includes a plurality of second cooling apertures 34 disposed in the same geometric arrangement as that of the first cooling apertures 32.

Referring to FIGS. 2–4, each finger seal 24 includes a first 36 and second 38 thin plate fixed to one another by conventional means. The first 36 and second 38 thin plates include a seal section 40 and an attachment section 42, at least one bending slot 44 disposed in the seal section 40, and at least one cooling slot 46 disposed in the attachment section 42. The bending slots 44 in the first 36 and second 38 thin plates are offset from one another and the cooling slots 46 are aligned with one another (see also FIG. 5). Offsetting the bending slots 44 enhances the ability of the fingerseal 24 to elastically deflect, while still providing the necessary sealing function. The cooling 46 and bending 44 slots are defined as having a length 48 (see FIG. 5) extending from end to end and a width 50 extending from side to side. FIG. 4 shows an embodiment where the first thin plate 36 is wrapped around the second thin plate 38 at the end. Wrapping the second thin plate 38 facilitates assembly of the fingerseal 24 and provides a rounded surface to abut the convergent section 14.

During assembly of the engine, the finger seals 24 are aligned with the first cooling apertures 32 of the liner 20. The stiffening ring 26 is installed over the fingerseals 24 and positioned such that the first cooling apertures 32 are offset from the second cooling apertures 34 of the stiffening ring 26. The stiffening ring 26 and the fingerseals 24 are subsequently fixed to the liner 20 by conventional means, such as rivets 52 (see FIGS. 3 and 4). Rivets 52 securely hold the assembly together, and yet are easily removed for later maintenance. The cooling slots 46 within the fingerseals 24 provide passages between the first 32 and second 34 cooling apertures.

Referring to FIG. 3, after assembly of the engine the augmentor fingerseal assembly communicates with the forward end 54 of the convergent section 14 of the nozzle 12. Specifically, the finger seals 24 are biased against the forward end 54 of the convergent section 14. The fingerseal 24 bias enables the augmentor 10 (see FIG. 1) to maintain a seal with the nozzle 12 regardless of the disposition of the nozzle 12 relative to the augmentor 10.

Referring to FIG. 1, under operating conditions core gas flow 56 passes through the augmentor 10 and nozzle 12 and exits producing thrust. At the same time, bypass air 58, at a temperature lower than that of the core gas flow 56, passes through the annular passage 60 between the augmentor liner 20 and the outer casing 22. A percentage of the bypass air 58 bleeds off throughout the augmentor 10 through cooling apertures within the liner 20, forward of the fingerseal assembly. The fingerseals 24 prevent the remaining bypass air 58 from escaping between the augmentor 10 and the nozzle 12, forcing the bypass air 58 to continue on into the nozzle 12 where it is used for cooling purposes.

Now referring to FIG. 2, as the bypass air 58 passes the fingerseal assembly, a pressure difference across the liner 20 forces a percentage of the bypass air 58 into the second cooling apertures 34 of the stiffening ring 26. After passing through the second cooling apertures 34, the bypass air 58 travels within the cooling slots 46 in a direction substantially along the lengthwise axes of the slots 46, before entering the first cooling apertures 32. In the preferred embodiment, the cooling slots 46 are oriented circumferentially and therefore guide bypass air 58 in a direction substantially perpendicular to the path of the bypass air 58 flow. The bypass air 58 within the slots 46 subsequently passes through the first cooling apertures 32 within the liner 20 and exits into the core gas flow 56.

Although this invention has been shown and described with respect to the detailed embodiments thereof, it will be understood by those skilled in the art that various changes in form and detail thereof may be made without departing from the spirit and scope of the claimed invention. In the preferred embodiment, for example, the patterns of the first 32 and second 34 cooling apertures are alike. In alternative embodiments, the patterns of the first 32 and second 34 cooling apertures might differ from one another to customize the bypass air 58 flow within the cooling slots 46 in a particular manner.

We claim:

1. An augmentor for a gas turbine engine with a nozzle, comprising:

an outer casing;

a liner, received within said outer casing, having a forward and an aft end, and a plurality of first cooling apertures;

a stiffening ring, having a plurality of second cooling apertures;

a plurality of finger seals, positioned between said liner and said stiffening ring, wherein each said fingerseal includes a plurality of cooling slots, each cooling slot having a lengthwise axis;

means for fastening said stiffening ring and said fingerseals to said liner;

wherein said finger seals and said liner communicate with the nozzle to create a flexible seal between said liner and the nozzle; and wherein said cooling slots, said first apertures, and said second apertures are relatively positioned such that cooling air passing through said second cooling holes must thereafter travel within one of said cooling slots in a direction substantially along said lengthwise axis of said slot, before entering said first apertures.

2. An augmentor according to claim 1, wherein said outer casing and said liner are substantially annular and concentric with one another; and wherein said cooling slots are oriented circumferentially.

3. An augmentor according to claim 2, wherein each said fingerseal comprises:

a first thin plate, having a seal section and an attachment section, at least one bending slot disposed in said seal section, and at least one of said cooling slots disposed in said attachment section;

a second thin plate, having a seal section and an attachment section, at least one bending slot disposed in said seal section, and at least one of said cooling slots disposed in said attachment section;

wherein said first and second thin plates are attached to one another such that said bending slots are offset from one another and said cooling slots are aligned with one another.

4. An augmentor according to claim 3, wherein said seal sections of each said fingerseal are biased against the nozzle of the engine.

5. An augmentor according to claim 4, wherein said first and second cooling apertures are disposed in like patterns.

6. An augmentor according to claim 1, wherein each said fingerseal comprises:

a first thin plate, having a seal section and an attachment section, at least one bending slot disposed in said seal section, and at least one of said cooling slots disposed in said attachment section;

a second thin plate, having a seal section and an attachment section, at least one bending slot disposed in said seal section, and at least one of said cooling slots disposed in said attachment section;

wherein said first and second thin plates are attached to one another such that said bending slots are offset from one another and said cooling slots are aligned with one another.

7. A fingerseal assembly for a gas turbine engine augmentor, comprising:

a liner, having a forward and an aft end, and a plurality of first cooling apertures;

a stiffening ring, having a plurality of second cooling apertures;

a plurality of finger seals, positioned between said liner and said stiffening ring, wherein each said fingerseal includes a plurality of cooling slots, each cooling slot having a lengthwise axis;

means for fastening said stiffening ring and said fingerseals to said liner; and wherein said cooling slots, said first apertures, and said second apertures are relatively positioned such that cooling air passing through said second cooling holes must thereafter travel within one of said cooling slots in a direction substantially along said lengthwise axis of said slot, before entering said first apertures.

8. A fingerseal assembly according to claim 7, wherein each said fingerseal comprises:

a first thin plate, having a seal section and an attachment section, at least one bending slot disposed in said seal section, and at least one of said cooling slots disposed in said attachment section;

a second thin plate, having a seal section and an attachment section, at least one bending slot disposed in said seal section, and at least one of said cooling slots disposed in said attachment section;

wherein said first and second thin plates are attached to one another such that said bending slots are offset from one another and said cooling slots are aligned with one another.

9. A fingerseal assembly according to claim 8, wherein said first and second cooling apertures are disposed in like patterns.

* * * * *

UNITED STATES PATENT AND TRADEMARK OFFICE
CERTIFICATE OF CORRECTION

PATENT NO. : 5,560,198
DATED      : October 1, 1996
INVENTOR(S) : Keith S. Brewer et al It is certified that error appears in the above-indentified patent and that said Letters Patent is hereby corrected as shown below:

Col. 4, In claim 1 at line 15, delete "one of".
Col. 5, In claim 7 at line 6, delete "one of".

Signed and Sealed this

Third Day of June, 1997

Attest:

BRUCE LEHMAN

Attesting Officer    Commissioner of Patents and Trademarks